Inventors.
Hermann Bäumler,
Paul Vossieck.

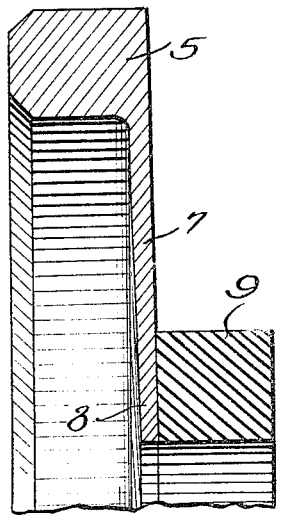
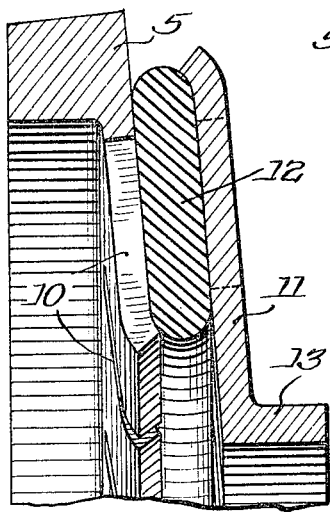
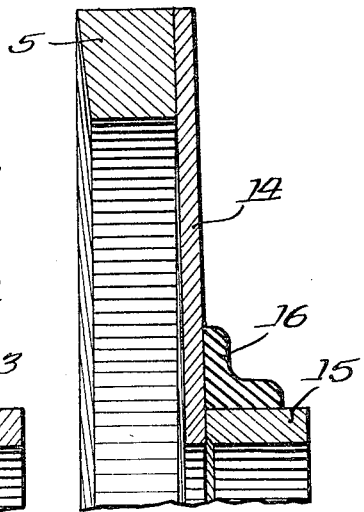
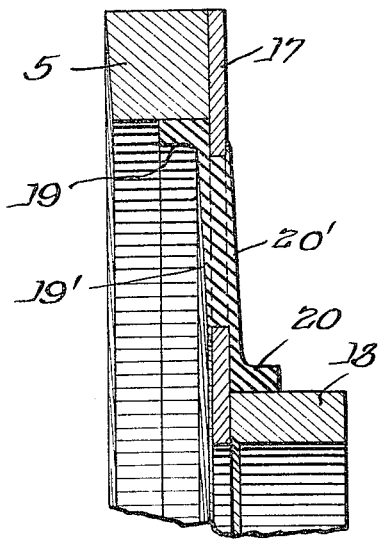
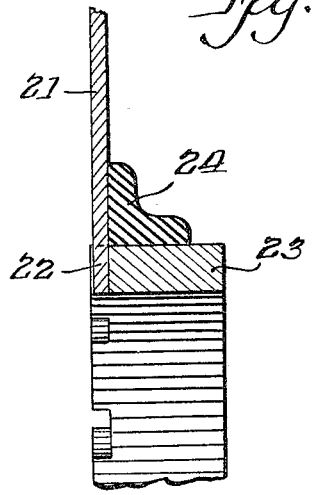

United States Patent Office 3,269,738
Patented August 30, 1966

3,269,738
GLIDE RING SEAL FOR ROTARY PISTON MOTORS
Hermann Bäumler and Paul Vossieck, Burscheid, Cologne, Germany, assignors to Goetzewerke Friedrich Goetze Aktiengesellschaft, Burscheid, Cologne, Germany, a corporation of Germany
Filed Aug. 15, 1962, Ser. No. 224,268
Claims priority, application Germany, Aug. 16, 1961, G 32,937
5 Claims. (Cl. 277—81)

The invention disclosed herein is concerned with a glide ring seal, especially for use in connection with rotary piston motors, comprising an annular disk type spring for pressing the glide ring against a part which is to be sealed. The glide ring may be made integral with the disk type spring or may be suitably secured thereto. The disk type spring may be cone shaped or may extend in a radial plane.

The use of a disk type spring for pressing a glide ring in operative position is already known. The advantages of such a spring reside in its low structural height and favorable spring characteristic. Springs of this kind have been sparingly used in practice, despite the advantages which they present, because it was until now impossible to solve satisfactorily the problems arising with respect to the liquid-tight and gas-tight connection at the side of the glide ring as well as at the marginal zone of the spring. The art also hesitated to use disk springs in any considerable quantities on account of the relatively high cost thereof. Attempts were therefore made to make such springs of a feathered band and to join the ends thereof by welding.

Glide ring seals are being used for sealing machine parts of rotary piston motors, the glide ring of which is integral with a membrane-like part, such membrane having an axially extending supporting rim which serves as an abutment for an elastic seal. However, this supporting rim stiffens the membrane to such an extent that only very slight axial play can be equalized. It has therefore been proposed to slot this axially extending supporting rim. The slots reduce the resistance of the supporting rim against tangential elongation and make the membrane softer for bending.

The invention proceeds from recognition of the fact that a disk spring changes in diameter when subjected to a load. It is in accordance with the invention proposed to provide a disk spring which has at least one radially freely movably journalled marginal zone, without having any axial projections serving as supports, thereby obtaining an optimum softness of the spring. The radial mobility of the spring reliably prevents engagement thereof with a marginal zone at the adjacent machine part and stiffening of the spring that may be caused thereby. It is moreover important that the radially freely movably journalled marginal zone is elastically sealed with respect to the associated machine part without being by such sealing hindered in its radial mobility. It is thereby possible to transmit torque over the elastic sealing to the glide ring. In the case of highly loaded seals, the transmission of torque can be effected with the aid of particular means; for example, the marginal zone of the disk spring can engage the adjacent part in toothed manner.

A further possibility of making the disk spring soft for bending resides in slotting it in known manner and to cover the slots by means of the material of the elastic seal. Moreover, a plurality of disk springs may be disposed one in back of the other. For example, there may be used two disk springs in mutually partially covering relationship, having an elastic seal inserted therebetween which permits radial mobility of the springs relative to each other.

A seal may be produced in particularly simple manner by making the disk spring and the glide ring each of one piece and, for example, vulcanizing the elastic seal thereto. The elastic seal can then also serve as axial support for the disk spring, thus eliminating further supporting elements. Upon elastic actuation of the disk spring, there will be produced between the support and the spring a link which is relatively free of friction, with shifting possibilities in radial direction. In the event of danger that the elastic seal may tend to lasting deformation, on account of external influences, for example, high temperatures, such deformations may be kept within limits in which they do not affect the sealing properties of the glide ring seal. However, a metallic band or ring is, in the case of highly loaded seals advantageously used as a supporting element for the disk spring, whereby the ring is preferably elastically connected with the disk spring, for example, by vulcanization with an elastic material. An elastic angular connection is thereby obtained which permits motion of the disk spring in radial direction while at the same time effecting the sealing between the parts. The end surface of the supporting ring is in the region of the disk spring engagement preferably rounded in order to prevent binding.

It is in addition to the possibility of making the glide ring and the disk ring in one piece, of the same material, for example, cast iron, feasible to separate the glide ring from the spring and to connect them, for example, by vulcanizing, over an elastic link.

Examples of the invention will now be described with reference to the accompanying drawings.

FIGS. 3 to 6 show different embodiments of glide ring seals in sectional views, machine parts being omitted, each embodiment being represented by one-half of its cross-sectional extent; and FIG. 7 shows how the disk spring can be secured to a supporting ring against rotation with respect thereto.

Figure 1:
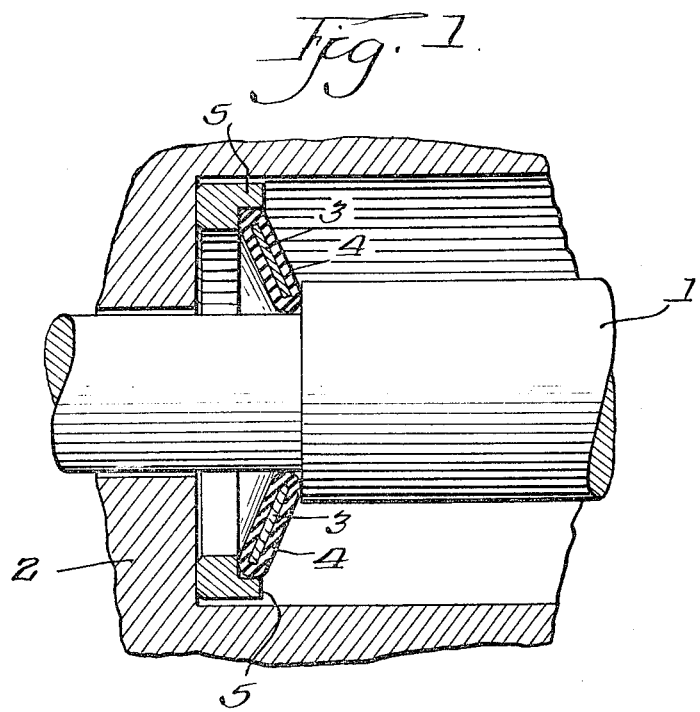
FIGS. 1 and 2 show in sectional views glide ring seals comprising respectively a glide ring and a cone shaped disk spring embedded in an elastic material vulcanized or otherwise secured thereto, these seal parts being indicated in their relative positions with respect to machine parts.

The glide ring seal shown in FIG. 1, which is disposed between a rotating shaft 1 and a housing part 2, comprises a disk spring 3 embedded in an elastic material 4, such disk spring being removably connected with the glide ring 5. The radial mobility of the disk spring results from the elastic properties of the material 4. The glide ring 5 and the disk spring 3, 4, which is as shown a cone spring, rotate with the shaft 1. The disk spring may be radially slotted if desired, which also applies to the disk springs shown in at least some of the remaining embodiments.

Figure 2:
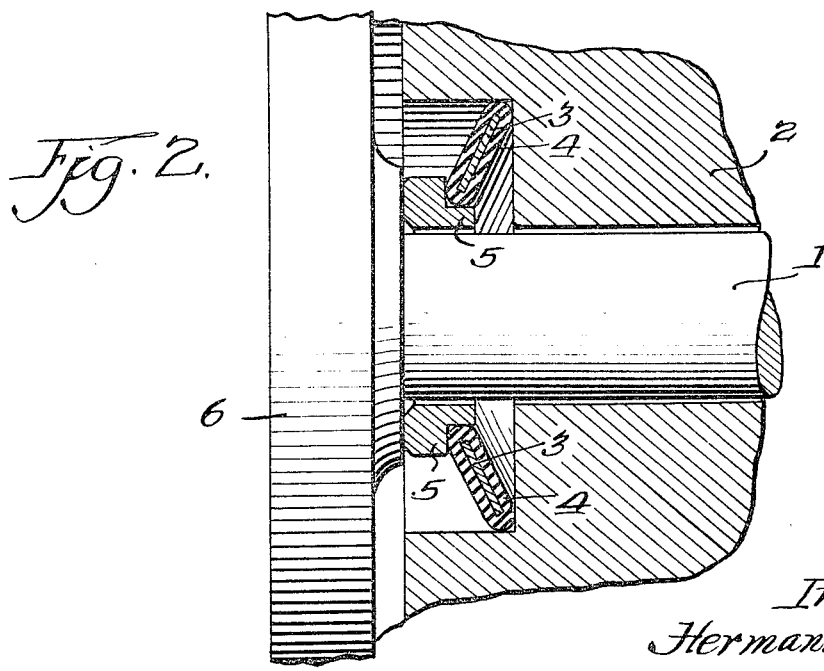

The structure shown in FIG. 2 is similar to the one shown in FIG. 1, like parts being similarly referenced. Numeral 6 indicates a vane wheel attached in suitable manner to the shaft 1. The glide ring 5 and its cone shaped disk spring 3, 4 are stationary.

The glide ring seal represented in FIG. 3 comprises the glide ring 5 which is integral with the disk spring 7. The marginal zone of the disk spring 7 is radially movably supported on an annular elastic sealing member 9 which is vulcanized thereto. The cross-sectional shape of the sealing member 9 is of no critical importance for the invention. This seal may be used in connection with machine parts as shown in FIG. 1 or in inverted position in connection with machine parts as shown in FIG. 2. Putting it in other words, the axis of rotation may be below or above the seal. This also applies to the remaining embodiments indicated in FIGS. 4 to 6.

The glide ring seal represented in FIG. 4 comprises the glide ring proper, indicated by numeral 5, which is like the similarly referenced glide ring shown in FIG. 3 integral with a disk spring 10, such spring having radially extending slots formed therein. A further disk spring 11 is provided, which may likewise be radially slotted and which is axially spaced from the disk spring 10 by means of an elastic sealing member 12, such sealing member overlying the slotted parts of the two disk springs 10 and 11. Numeral 13 indicates an axial extension of the spring 11, serving as a supporting ring. The intermediate elastic member 12 may be firmly connected with the disk springs 10 and 11, for example, by vulcanization or the like. However, it is possible to insert the sealing member 12 between the disk springs without firmly connecting it thereto.

The seal indicated in FIG. 5 comprises the glide ring proper, indicated by numeral 5, and a disk spring 14 suitably secured thereto, for example, by welding or the like, and radially inwardly extending therefrom. The disk spring 14 rests against a metallic axially extending supporting ring 15 which is connected therewith by means of an angular elastic member 16 which is vulcanized or otherwise suitably secured or cemented thereto. The active glide face of the glide ring 5 is slightly conically shaped so that it can readily assume the desired position with respect to the machine part which is to be engaged thereby. This particular feature (conical configuration of the active face of the glide ring) can be if desired employed in connection with any of the other sealing structures.

The embodiment shown in FIG. 6 comprises the glide ring proper, indicated again by numeral 5, a radially slotted disk spring 17 and a supporting ring 18. The glide ring 5 and the supporting ring 18 are connected with the disk spring 17 by means of angular elastic members 19 and 20 having arms respectively indicated at 19' and 20' which provide a seal for the radial slots formed in the disk spring 17.

FIG. 7 shows part of a disk spring 21 having teeth formed at the inner rim 22 thereof, such teeth extending into recesses formed in the supporting ring 23. Numeral 24 indicates an elastic angular connecting member similar to connecting members such as shown in FIG. 5 at 15 and in FIG. 6 at 20. The disk spring 21 is thus secured against rotation with respect to the supporting ring 23 or, putting it into other words, torque can be transmitted from the supporting members 23 to the disk spring 21 which is, of course, provided with an annular glide ring proper such as the glide ring 5 in the other embodiments.

The glide ring proper and the respective disk springs are in all embodiments made of suitable metallic material. Wherever required, the glide ring may be welded, soldered or otherwise suitably cemented to the respective disk spring. The elastic sealing parts are made of rubber or similar material. Connections between metallic and elastic parts are established by vulcanization or cementing or the like.

Changes may be made within the scope and spirit of the appended claims which define what is believed to be new and desired to have protected by Letters Patent.

We claim:

1. A glide ring seal arrangement for sealing between first and second relatively rotating radially spaced machine parts and adapted for insertion as a single integral unit between said machine parts, said seal arrangement comprising; resilient annular disk-like spring means having inner and outer marginal regions, a metal glide ring fixedly connected to one side of said spring means at one of said inner or outer marginal regions and projecting axially therefrom, said glide ring having an annular face on the side facing away from said spring means operable for slidingly sealingly engaging a radial surface on one of said machine parts, the other of said marginal regions being radially spaced from the other of said machine parts, a second ring at said other of said marginal regions forming a part of said seal arrangement and adapted for sealing engagement with a radial surface of the other of said machine parts and also operable for tensioning said spring means to hold said glide ring in pressure engagement with said one machine part, and means maintaining a seal between said second ring and said glide ring.

2. A glide ring seal arrangement according to claim 1, in which said glide ring is integral with and formed directly on said spring means at said one marginal region of the spring means.

3. A glide ring seal arrangement according to claim 1, in which said spring means is radially slotted and said means includes resilient means covering and sealing the slots in the spring means.

4. A glide ring seal arrangement according to claim 1, in which said spring means comprises coaxial axially spaced annular springs in radially overlapping relation, said glide ring being connected to one of said springs, said second ring comprising a portion of the other of said springs, and said means sealing between said second ring and said glide ring comprising a washer-like ring of resilient material sealingly disposed between and engaging said springs.

5. A glide ring seal arrangement according to claim 1, in which said second ring is sleeve-like and said means sealing between said second ring and said glide ring includes an annular resilient ring connected to said spring and to said second ring.

References Cited by the Examiner

UNITED STATES PATENTS

| 2,279,669 | 4/1942 | Friskney | 277—95 |
| 2,600,434 | 6/1952 | Saywell | 277—95 |
| 3,075,781 | 1/1963 | Atkinson et al. | 277—83 |

FOREIGN PATENTS

| 727,135 | 3/1955 | Great Britain. |

LAVERNE D. GEIGER, *Primary Examiner.*

SAMUEL ROTHBERG, *Examiner.*

E. DOWNS, J. MEDNICK, *Assistant Examiners.*